United States Patent [19]

Keeler

[11] Patent Number: 5,034,810
[45] Date of Patent: Jul. 23, 1991

[54] TWO WAVELENGTH IN-SITU IMAGING OF SOLITARY INTERNAL WAVES

[75] Inventor: R. Norris Keeler, McLean, Va.

[73] Assignee: Kaman Aerospace Corporation, Bloomfield, Conn.

[21] Appl. No.: 447,209

[22] Filed: Dec. 7, 1989

[51] Int. Cl.$^5$ .......................... H04N 7/00; H04N 7/18
[52] U.S. Cl. ...................................... 358/95; 358/99; 356/5
[58] Field of Search .................. 358/95, 99, 93; 356/5

[56] References Cited

U.S. PATENT DOCUMENTS

| | | | |
|---|---|---|---|
| 2,541,374 | 2/1951 | Morton | 313/399 |
| 2,996,946 | 8/1961 | Brendholdt | 356/5 |
| 3,278,753 | 10/1966 | Pitt et al. | 250/564 |
| 3,305,633 | 2/1967 | Chernoch | 358/95 |
| 3,360,793 | 12/1967 | Collis | 356/5 |
| 3,380,358 | 4/1968 | Neumann | 354/145.1 |
| 3,426,207 | 2/1969 | Fried et al. | 455/611 |
| 3,446,555 | 5/1969 | Kahn | 356/5 |
| 3,446,556 | 5/1969 | Collis | 356/5 |
| 3,467,773 | 9/1969 | Heckman, Jr. | 358/95 |
| 3,499,110 | 3/1970 | Heckman, Jr. | 358/95 |
| 3,527,533 | 9/1970 | Hook et al. | 356/5 |
| 3,555,178 | 1/1971 | Humiston | 358/95 |
| 3,566,021 | 2/1971 | Jakes, Jr. | 358/90 |
| 3,604,803 | 9/1971 | Kahn | 356/5 |
| 3,649,124 | 3/1972 | Takaoka et al. | 455/604 |
| 3,669,340 | 6/1972 | Battman et al. | 229/170 |
| 3,669,541 | 6/1972 | Duguay | 455/604 |
| 3,670,098 | 6/1972 | Korpel | 358/112 |
| 3,674,925 | 7/1972 | Heckman, Jr. | 358/83 |
| 3,682,553 | 8/1972 | Kapany | 356/4 |
| 3,723,643 | 3/1973 | Cornsweet | 358/95 |
| 3,743,418 | 7/1973 | Heflinger | 356/5 |
| 3,761,180 | 9/1973 | Maxwell, Jr. et al. | 356/152 |
| 3,781,552 | 12/1973 | Kadrmas | 250/214 DC |
| 3,782,824 | 1/1974 | Stoliar et al. | 356/342 |
| 3,834,795 | 9/1974 | Erickson et al. | 350/485 |
| 3,875,388 | 7/1975 | Townsend | 354/132 |
| 3,886,303 | 5/1975 | Morris | 358/83 |
| 3,895,388 | 7/1975 | Townsend | 354/132 |
| 3,897,150 | 7/1975 | Bridges et al. | 356/5 |
| 3,899,250 | 8/1975 | Bamberg et al. | 356/5 |
| 3,902,803 | 9/1975 | Lego, Jr. | 356/5 |
| 3,934,082 | 1/1976 | Gordon | 358/95 |
| 3,947,119 | 3/1976 | Bomberg et al. | 356/5 |
| 4,030,831 | 6/1977 | Gowrinathan | 356/327 |
| 4,050,819 | 9/1977 | Lichtman | 356/51 |
| 4,129,780 | 12/1978 | Laughlin | 250/333 |
| 4,143,400 | 3/1979 | Heckman, Jr. et al. | 358/95 |
| 4,174,524 | 11/1979 | Moran | 358/95 |
| 4,193,088 | 3/1980 | Moran | 358/95 |
| 4,195,221 | 3/1980 | Moran | 455/609 |
| 4,195,311 | 3/1980 | Moran | 358/95 |
| 4,197,088 | 4/1980 | Meserol et al. | 436/528 |
| 4,199,253 | 4/1980 | Ross | 356/5 |
| 4,226,529 | 10/1980 | French | 356/5 |
| 4,239,388 | 12/1980 | Green | 356/5 |
| 4,270,142 | 5/1981 | Mackelburg et al. | 358/99 |
| 4,277,167 | 7/1981 | Eppel | 356/5 |

(List continued on next page.)

OTHER PUBLICATIONS

Brochure "Airborne Lidar Detection of Subsurface Oceanic Scattering Layers"; Applied Optics; Hoge et al.; Oct. 1, 1988; vol. 27 No. 19; pp. 3969-3977.

Primary Examiner—John K. Peng
Attorney, Agent, or Firm—Fishman, Dionne & Canton

[57] ABSTRACT

A two wavelength lidar imaging system for underwater applications is presented which employs image subtraction. More specifically, a two wavelength lidar system is presented wherein two substantially simultaneously timed laser pulses of different wavelengths are emitted and are expanded by optics to illuminate the water below. A framing camera is then gated to receive light reflected or scattered back from the water. The light backscattered is filtered through narrow pass filters before it is recorded at the gated cameras. A specific application is disclosed in which the lidar imaging system is used to detect the passage of internal waves or other anomalies appearing in the ocean.

31 Claims, 4 Drawing Sheets

U.S. PATENT DOCUMENTS

| | | | |
|---|---|---|---|
| 4,298,280 | 11/1981 | Government | 356/5 |
| 4,380,391 | 4/1983 | Buser et al. | 356/5 |
| 4,397,549 | 8/1983 | Morgan | 356/5 |
| 4,515,471 | 5/1985 | Eden | 356/5 |
| 4,515,472 | 5/1985 | Welch | 356/5 |
| 4,518,254 | 5/1985 | Penny et al. | 356/5 |
| 4,603,250 | 7/1986 | Contini et al. | 250/213 VT |
| 4,634,272 | 1/1987 | Endo | 356/5 |
| 4,639,590 | 1/1987 | Butterwick | 250/213 VT |
| 4,646,140 | 2/1987 | Bailey et al. | 358/50 |
| 4,687,326 | 8/1987 | Corby, Jr. | 356/5 |
| 4,688,086 | 8/1987 | Hutchin | 358/95 |
| 4,708,473 | 11/1987 | Metzdorff et al. | 356/5 |
| 4,717,252 | 1/1988 | Halldorsson et al. | 356/5 |
| 4,727,259 | 2/1988 | Halois | 250/171 |
| 4,754,151 | 6/1988 | Billard | 250/574 |
| 4,757,200 | 7/1988 | Shepherd | 250/332 |
| 4,796,090 | 1/1989 | Fraier | 358/211 |
| 4,862,257 | 8/1989 | Ulich | 358/95 |
| 4,964,721 | 10/1990 | Ulich et al. | 358/95 |
| 4,967,270 | 10/1990 | Ulich et al. | 358/95 |

TWO WAVELENGTH IN-SITU IMAGING OF SOLITARY INTERNAL WAVES

BACKGROUND OF THE INVENTION

This invention relates to a method and apparatus for remote imaging of oceanographic artifacts at depths down to and below the thermocline, for example, internal waves that exist at various depths in the ocean, particularly around the thermocline. More particularly, the invention relates to a technique for detecting and identifying internal waves using an imaging lidar system.

For a number of years, oceanographers have been studying internal waves, and measuring their behavior. These techniques are limited because of the need to insert sensors directly in the ocean to a given depth and in a given location to obtain data. What these sensors actually record is the presence of internal waves passing a given geographic point. Simple bathymetric techniques cannot provide a physical picture of the wave but only, with great difficulty, infer its presence. The differential colorimetric effects of vertical displacement on upwelling light from layers of biologically active material in the thermocline has been studied. These changes in the spectrum of upwelling light can also be detected as spatial changes in relative spectral line intensity of reflections of laser light over broad area by new techniques described herein using techniques and equipment similar to those previously disclosed in U.S. Pat. No. 4,862,257 and assigned to the assignee hereof.

In view of the foregoing, there continues to be a need for an accurate and efficient method and apparatus for the remote measuring of anomalies (such as internal waves) which are present below the surface of a body of water, particularly below the thermocline of the ocean.

SUMMARY OF THE INVENTION

The present invention overcomes the problems of the prior art by providing an apparatus and method for detecting and identifying hydrodynamic anomalies below the surface of a body of water such as internal waves. The present invention uses a two wavelength imaging system with a double notch filter at the two wavelengths. A laser is used to generate a two wavelength pulse in the ten to one hundred nanosecond pulse length regime. The pulse is expanded to illuminate a given area of the ocean surface, and is propagated down into the body of water (e.g. thermocline). Cameras (preferably CCD cameras) are then gated to observe a "slice" of the ocean which is horizontally bounded by the laser illumination and the camera field of view and vertically bounded by the gated light transit time. The two images are then superimposed (e.g. subtracted) and the resultant image is referred to ambient conditions in the thermocline. When upwelling occurs, the effect on the reflected spectrum of light is wavelength dependent, except at arond 525 nm (e.g. the "hinge point"). Above and below this "hinge point" there is a varying spectral effect. This effect has been calculated for the case of reflected sunlight continuously upwelling from depth, and has been measured in association with internal wave propagation.

Two embodiments of the present invention are disclosed. In a first embodiment, a single laser capable of transmitting two wavelengths substantially simultaneously in conjunction with a pair of gated camera-receivers are used. In a second embodiment, a pair of lasers in conjunction with a single camera-receiver is utilized.

The present invention is particularly well suited for detecting the passage of internal waves in a body of water below the thermocline.

These above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENTS

A system is known for remote detection and imaging of objects underwater (or objects obscured by other backscattering media which is at least partially transmitting to light such as ice, snow, fog, dust and smoke) from an airborne platform. Such a prior art system is described in U.S. Pat. No. 4,862,257 which is assigned to the assignee hereof and incorporated herein by reference.

The imaging lidar system of U.S. Pat. No. 4,862,257 utilizes a laser to generate short pulses of light with pulse widths on the order of nanoseconds. The laser light is expanded by optics and projected down toward the surface of the water and to an object or target. Intensified CCD (charge coupled device) cameras are electronically shuttered after a time delay corresponding to the round trip propagation time to and from the target. This timing eliminates light scattered by the water from in front of and behind the target. As a result, the veiling luminance of the water is greatly attenuated and faint target signatures can be seen. The resulting gated images (displayed on a CRT) have sufficient spatial resolution to classify and/or identify the target.

Figure 1:
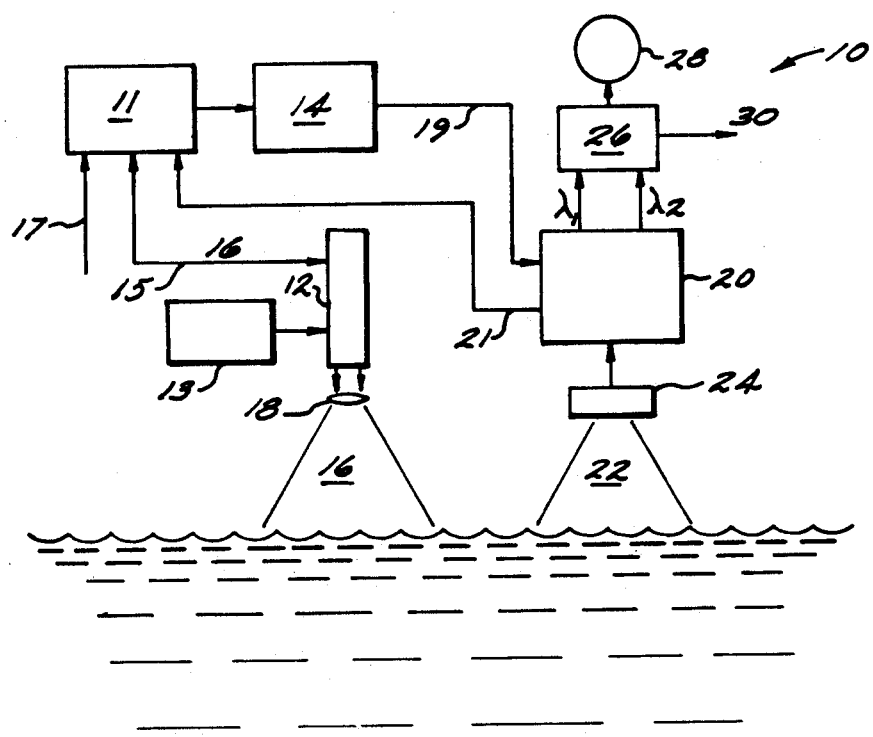
FIG. 1 is a schematic diagram depicting a two wavelength imaging lidar system in accordance with the present invention.
Figure 5A:
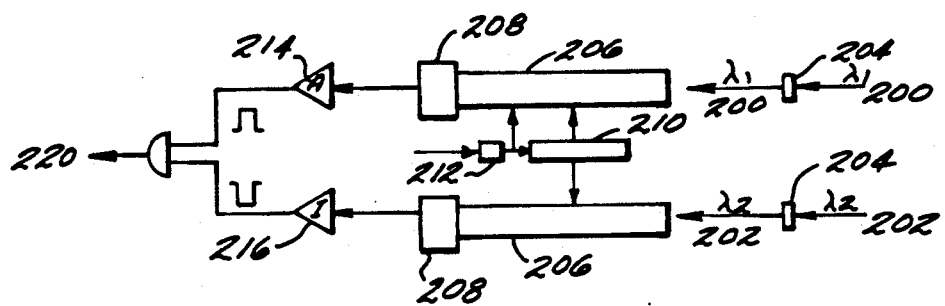
FIG. 5A is a schematic showing the details of the hardware for image subtraction in the single laser transmitter, two camera embodiment of FIG. 3A.
Figure 5B:
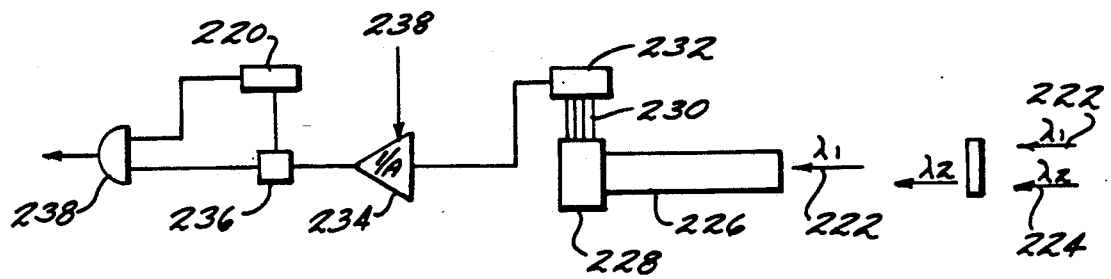
FIG. 5B is a schematic showing the details of the hardware for image subtraction in the two laser transmitter, single camera embodiment of FIG. 3B.

The present invention utilizes a lidar imaging system of the general type disclosed in U.S. Pat. No. 4,862,257. Referring to FIG. 1, the two wavelength imaging lidar of the present invention is shown at 10. The system 10 of this invention comprises an illuminating laser system 12 powered by power supply 13 which produces short (nanosecond) pair pulses of light at two wavelengths. The laser is triggered through line 15 by a pulse timing generator 11 which also provides timing for a pulse timing generator 14. Light 16 is directed downwardly to the ocean surface through expanding optics 18 over the area to be imaged. One or more CCD camera(s) 20 configured as shown in FIGS. 5A and 5B is gated electronically from the pulse timing generator 14 by the trigger pulse 19 at a time corresponding to the arrival of the back scattered light 22 containing the image of the illuminated volume through optics and filters 24. The backscattered light pulse arrival is electronically transmitted through line 21 to the pulse timing generators 11 and 14, opening the camera gate. What is seen is a volume defined by the area viewed by camera 20 (which must, of course, be illuminated by the laser), and the duration of the gate. The height or the vertical dimension of the volume imaged is given by the relationship $h = (\frac{3}{8}n) Dt$, where n is the refractive index of sea water (approximately 1.33). Therefore, if the gate is set at 80 ns, the height of the imaged volume will be approximately 30 feet. This, of course, assumes the laser pulse length to be short compared to the gate width. Thus, to the first approximation, light scattered back above the illuminated volume and light returning from below the volume defined by the gate is not seen. The light signals received by the camera are processed by video processor 26, and the presentation is made on the CRT 28. One of the outputs from the video processor is connected to a relative amplitude control 30. In order to detect internal waves, the pertubations in the thermocline must be visualized. In accordance with the method of this invention, the image at one given wavelength is subtracted from the image at a second wavelength (which may be the wavelength corresponding to the hinge point). Therefore, the CRT will normally show no image. As soon as the thermocline is disturbed by an internal wave, broad patterns will appear on the screen. The solar and laser noise will still be subtracted out, but there will be a new signal based on the change between the light scattered back at the two wavelengths.

Figure 2:
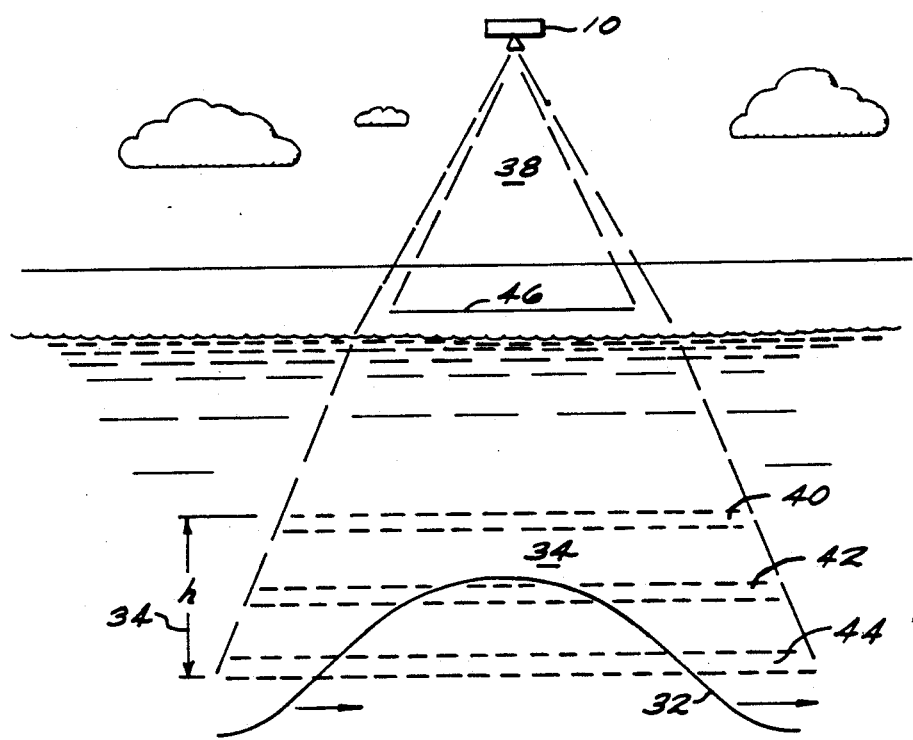
FIG. 2 is a diagrammatic view showing two wavelength framing of a solitary internal wave at depth.
Figure 6:
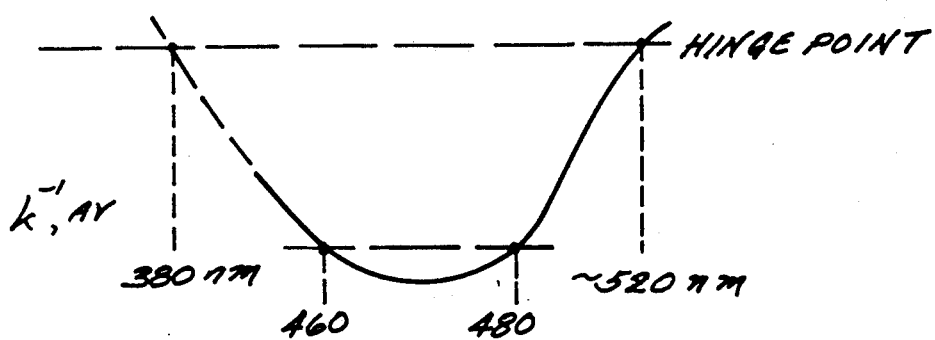
FIG. 6 shows the ranges for "balancing" light attenuation in the ocean, based on Jerlov curves.

The above situation is visualized in FIG. 2. An internal wave 32 is shown in the thermocline 34, moving from right to left and changing the spectral reflectivity at a given depth in the ocean as it moves. An imaging lidar system in accordance with the present invention such as system 10, is irradiating the ocean with a laser beam 38 consisting of repetitive pairs of pulses of two different wavelengths. The backscattered light pulses produce two (substantially) simultaneous one wavelength images subtracted to provide cancellation of the usual optical noise sources at depth. The CCD camera (or cameras) image(s) the internal wave in volumes 40, 42 and 44 whose vertical extent is h. The area 46 on the ocean surface is illuminated by the laser transmitter. If one takes the image of the frame associated with volume 42 and takes a one dimensional traverse across it normal to the direction of propagation of the internal wave there will be no signal observed since the thermocline in volume 40 is not disturbed by the passage of the internal wave. As soon as the disturbed region is reached in volumes 42 and 44, the difference in spectral behavior at the two wavelengths will result in a signal appearing on the screen proportional to the residual light intensity difference $|I - I_{520}|$. The method of selecting the proper wavelengths is shown in FIG. 6. This residual signal will provide a visualization of a horizontal "slice" of the internal wave in two dimensions. The slice in volume 42 will be long and narrow and the contrast will be slight. In volume 44 the image will show a broad stripe with strong contrast.

FIGS. 3A and 3B and FIGS. 5A and 5B provide two preferred embodiments of the two wavelength laser system of this invention. In the first embodiment, (FIGS. 3A and 5A), there is a single laser pumped in series with output pulses about 1 microsecond apart but with the pulse being comprised of two separate and distinct wavelengths. The pumped pair of pulses are repeated at the desired pulse repetition rate. Since the framing cameras available cannot recover in times as short as 1 microseconds, two CCD cameras are required for each pulse pair. In the second embodiment where there is only one camera per pulse pair (FIGS. 3B and 5B), two lasers must be used, one at each of the two desired frequencies. As it is desired to have the pair of output pulses as close together in time as possible in order to "freeze" the ocean images at both wavelengths, the limiting factor is the recovery time of the CCD camera. With special modifications, this can be a time as short as 30 microseconds. In this latter case, a time of 100 microsecond between the two pulses is more than sufficient to "freeze" the image at the two wavelengths. The scale of the optical noise encountered at depth in the ocean is much greater than the distance between successive images caused by airborne platform motion. For a 100 mph airborne platform, the movement is about four millimeters; for the one laser and two camera (1 microsecond) system, the movement is a factor one hundredth less because of the shorter time between pulse pairs.

Figure 3A:
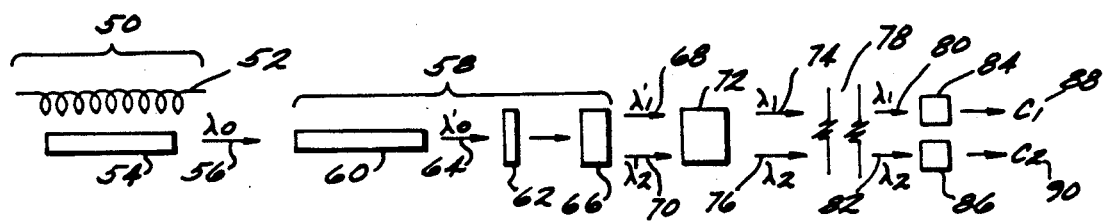
FIG. 3A is a schematic view showing the single laser transmitter in a preferred two camera embodiment.

Referring now to the one laser, two camera embodiment of FIG. 3A, the dye laser cavity 50 comprises a bank of flashlamps 52 surrounding a dye laser 54. This dye laser utilizes a high efficiency dye (approximately 3%) emitting light pulses 56 of wavelength $\lambda_0$ (the pump band of titanium doped sapphire laser material). This ensures efficient transfer to the output wavelengths of this type of solid state laser. The light pulses, each several microseconds in duration enter the titanium sapphire laser cavity 58, pumping the laser rod 60 to near full inversion. The laser is discharged by the Q-switching element 62 with output pulses 64 of some wavelength $\lambda'_0$ which would be characteristic of the natural resonance of the laser cavity 58. The concept of the generation of pulses 64 is introduced to indicate how cavity 58 would function under normal conditions. Pulses 64 never actually appear since the resonance characteristics of laser cavity 53 are dynamically controlled by the presence and operation of an electro-optic tuner 66. This element is activated and tuned initially so that the naturally occurring resonant wavelength of cavity 58 is no longer characteristic of the "naturally occurring" light pulses 64, but is now characteristic of light pulses 68, of wavelength $\lambda'_1$ and pulses 70 of wavelength $\lambda'_2$ depending on how the electro-optic tuner is set. Pulse 63, and roughly 1 microsecond later, pulse 70 are emitted; they pass out of laser cavity 58 and through the frequency doubler 72, generating light pulse 74 of wavelength $\lambda_1$ and, one microsecond later, light pulse 76 of wavelength $\lambda_2$. These pulses 74 and 76 are some 20–30 nm different in wavelength in the 400–510 nm range. Pulses 74, 76 are propagated out through the beam spreader and propagate out into a scattering medium 78. The pulses 74, 76 then return to the system as backscattered pulses 80 and 82 each passing through narrow bandpass filter 84 and 86, and into the separate camera and optics systems 88 and 90, where they are processed for presentation as shown in FIG. 5A. These back scattered pulses are extended both spatially and temporally because of the duration of the scattering process. The CCD camera gating permits the choice of the segment of the ocean or other scattering medium which is chosen to be viewed.

The overall process of the present invention may be summarized in the following way. The dye laser is pumped by the flashlamps and emits light over a period of several microseconds, a pulse length typical of dye laser performance. It is possible to pump the titanium sapphire rod with the dye laser light for one microsecond, then discharge it by Q-switching. This Q-switched discharge produces pulses which are characteristically 5–10 ns in duration whose wavelength is determined by the cavity characteristics and the electro-optic tuner. After emission of the first pulse, the dye laser continues to emit light and begins to start pumping the titanium sapphire laser again. After about 1 microsecond, the titanium sapphire laser is ready to discharge; now, however the electro-optic tuner has been reset, and the cavity characteristics are changed so that the wavelength of the light pulse emitted is some 40 nm different than the initial pulse. After frequency doubling and beam spreading, the two pulses travel down to the scattering medium, one microsecond apart, are scattered and return to the CCD cameras. The second pulse is subtracted from the first, eliminating optical noise and leaving the wavelength dependent artifacts from such hydrodynamic disturbances as internal waves.

Figure 3B:
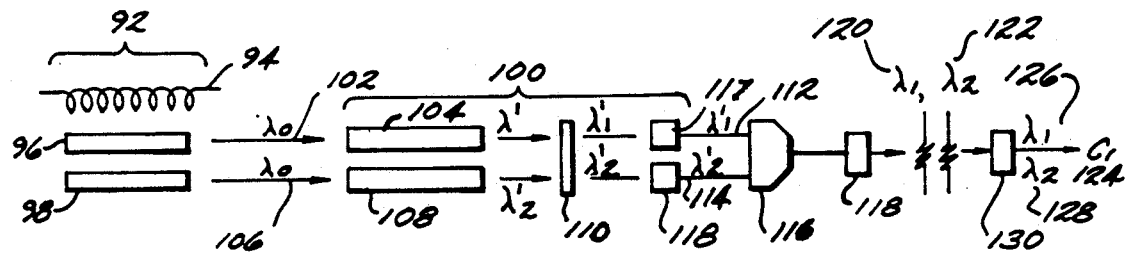
FIG. 3B is a schematic view showing the two laser transmitter in a preferred single camera embodiment.

Referring to the second embodiment (two laser, single camera) of this invention shown in FIG. 3B, the dye laser cavity 92 contains the flash lamps 94 and two separate dye laser cells 96 and 98. The flash lamps are pumped over a period of several hundred microseconds and dye laser cell 98 is discharged 100 microseconds after dye laser cell 96. The pulses of light enter the titanium sapphire laser cavity 100 and the titanium sapphire rods with light pulse 102 pumping titanium sapphire rod 104, and light pulse 106 pumping titanium sapphire rod 108 some 100 microseconds later. The rods are Q-switched out by Q-switch 110 in sequence but the light pulses 112 and 114 of wavelengths $\lambda'_1$ and $\lambda'_2$ have wavelengths determined by passive optical elements 116 and 118. Upon emergence from the laser cavity 100, the pulses 112 and 114 are combined into the same optical path by optical element 116 and pass through the frequency doubler 118 about 100 microseconds as before.

Frequency doubled pulses 120 and 122 pass through the output optics and into the scattering medium. Backscattering light from these two pulses returns as two extended backscattered pulses. These are scattered back and return to the CCD camera 124 as pulses 126 and 128. These pulses are extended in the scattering process, but CCD camera gating permits viewing the same segment at the two different wavelengths. A two wavelength narrow pass filter is used to exclude sunlight for daytime operations and is an integral part of the collecting optics 130.

Figure 4:
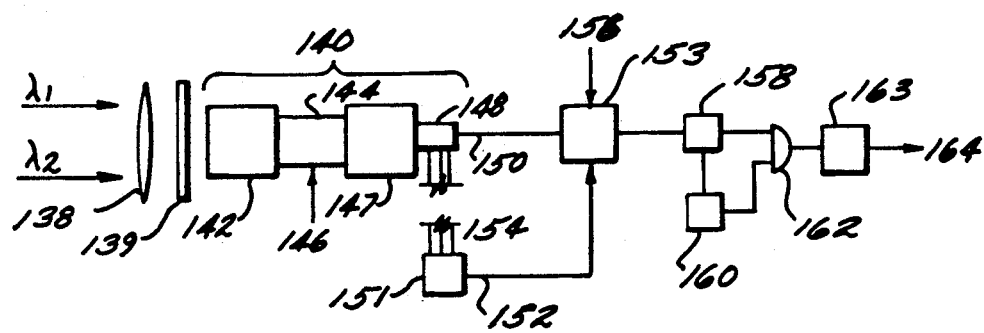
FIG. 4 is a schematic showing the details of relative amplitude and timing control circuits for use in the present invention.

FIG. 4 is an overall schematic of the preferred embodiment of the present invention. The optical viewing system of FIG. 4 is similar to the LIDAR system disclosed in U.S. Pat. No. 4,862,257. The collecting optics 138 is unchanged with the exception of a notch filter 139 which is used to pass the two light wavelengths to the CCD camera. However, two important distinctions are the presence in the system of this invention of a relative amplitude control and the two wavelength laser. The CCD camera 140 is a Marco Scientific Model 201 Camera. It uses one of two fiber optic windows 142 and 147 to couple the sensor to an intensifier tube 144. The intensifier tube actually provides the camera gate for imaging from an external signal 146. The photocathode 148 will optimize response in the 420–510 nm wavelength range which is consistent with two wavelength operation appropriate for oceanographic applications. Items 150 and 152 are inputs to an A/I amplifier (described in FIG. 5) and along with inputs 154 and 156 are part of the CCD electronics. Items 158, 160 and 162 are storage, delay and subtracting elements, (also described in FIG. 5). The timing control elements are a precision timing generator 153 (split for simpler visualization), a fixed delay generator 151 and a computer control 156. The digital frame memory which stores the residual image 168 is coupled to the video output 164.

The one wavelength operation of these components has been described previously in U.S Pat. No. 4,862,257. However, simultaneous subtraction of two images cannot be done with presently existing CCD cameras, because there is no way, at present, to introduce polarity information to the CCD elements. Subtraction of input at two frequencies can be done by the use of two cameras. As instantaneous subtraction of simultaneously arriving photons cannot take place within one camera there must be a sufficient delay between pulse pairs if only a single camera is used. The solution to this problem is given in FIGS. 5A and 5B. The rest of the embodiment is as previously described, except that the computer control orders attenuation of one of the beams or one of the CCD camera(s) images based on optimum amplitude to provide a normalized zero noise signal under conditions where only optical noise is present; a situation most frequently encountered in the open ocean.

Referring to FIG. 5A the returning backscattered pulses 200 and 202 pass through the collection optics and narrow band pass filters 204. Since there are two separate CCD cameras, separate optics are used with two separate single wavelength narrow bandpass filters passing the wavelengths $\lambda_1$ and $\lambda_2$. The light pulses pass through the image intensifiers 206 and to the CCD detectors 208. In order to null out noise, the capability of controlling the high voltage power supply 210 through a balancing element 212 is added. The CCD output from the arrival of pulse 200 is fed to the amplifier 214; the output from the arrival of pulse 202 is fed to inverting amplifier 216. Since pulse 200 arrived microseconds before pulse 202, the readout of the CCD camera feeding amplifier 214 must be delayed by an amount equal to the spacing between the two pulses so that the readouts may arrive at the diode 218 at precisely the same time. Subtraction is accomplished at diode 218 and the output sent to a display or storage 220.

Referring to FIG. 5B, the returning backscattered pulses 222 and 224 originate from two different lasers and are separated in time by some 100 microseconds. Pulse 222 enters the image intensifier 226 and registers on the CCD detectors 228. These arrays are normally read off in rows by columns serially and typical recovery times are of the order of 10–20 milliseconds. In this case, the CCD array is read off by rows,in parallel on separate leads 230 stored and retransmitted at 232 and then passed through the amplifier/inverting amplifier 234. This process can take place in times as short as 30 microseconds and in this case a recovery time of 100 microsecond is assumed allowing the CCD camera to receive pulse 224 some 100 microsecond after the receipt of pulse 222. The storage and retransmission unit 232 takes the parallel outputs 230 and restores them to series format transmitting them through the amplifier/inverting amplifier 228 operating in the amplifier mode. When the switch 236 senses a positive voltage, it stores the series from pulse 222 at the arrival of pulse 224, the function command signal 238 configured as an inverter amplifier. Upon sensing the negative signal, the switch 236 passes the series train of pulse 224 and triggers the release by 220 of the stored or delayed pulse 222 data. The two pulse data trains then enter the diode 238 simultaneously and are added (subtracted) leaving the residual hydrodynamic artifacts.

Referring to FIG. 6, in a preferred embodiment, the attenuation of the two wavelengths should be equal and they should be chosen to straddle the Jerlov minimum. Notice that this means that the wavelength of the laser operating away from the hinge point is a function of the class of the water. The difference is most pronounced in Class 1 water where $\lambda_1$ is approximately 390 nm. This spread places a strain on the operating system. As the water approaches Class III, the difference lessens. Of course with weighting applied to the subtracting circuit, any wavelength would be satisfactory as the setting of the amplifier for either channel can be nulled to a minimum in the background noise. Another possibly preferred technique is to operate at two attenuation points on either side of the Jerlov minimum. In this latter case, the effect of water class change would not be as significant. To summarize, if one of the wavelengths is at the hinge point, the other should be at a point on the other side of the Jerlov minimum so that the overall attenuations of the two wavelengths is equal. This is shown in FIG. 6 for several wavelengths and several classes of water.

As stated above, the specific embodiments described are only representative in providing a basis which defines this invention. In these embodiments, the pumping laser is a dye laser using a high efficiency (approximately 3%) dye lasing around 520 nm. This wavelength is in the middle of the titanium sapphire pump band leading to a very efficient (approximately 45%) energy transfer to the natural lasing wavelengths of the titanium sapphire rod in the near infrared. One of the advantages of titanium sapphire is that it lasers over a substantial range from about 800-950 nm. Its response is flat over this range but in these embodiments care must be taken that the pulse energies at the two different wavelength are nearly equal. There is loss in the electro-optic tuners, the Q-switches and the frequency doubler. Using off-the-shelf components, a system càn be configured to produce up to 200 mJ/pulse at a pulse (pair) repetition rate of 20-30 Hz. Relative amplitude control is available to both laser transmitter and CCD cameras.

It should be evident from the above description that a lidar imaging system has been described which can detect colorimetric anomalies in and below the thermocline which have natural causes; for example the passage of an internal wave.

Thus, in accordance with the present invention, an optical sensor scans the surface of the ocean. The reflected upwelling sunlight has the optical spectrum characteristic of the material from which it is reflected. Given a horizontally homogeneous ocean, spectral differences across the field of view would be uniform. However, as is known, the presence of internal waves can cause spectral differences of geometric reasons alone, as the wave passage changes the height of the turbid water overlaying the subthermocline blue water.

The result of this effect is to create a picture of the volume involved in the upwelling across the field of the camera. Depending on the scale of the internal waves and their amplitude, the ocean can give a "ribbed" appearance as trains of internal waves are viewed. On a smaller scale, at least in principle, the disruption of the thermocline microstructure can also be detected.

Prior art using passive two color photometry has the disadvantage that the viewing process emphasizes near surface phenomena and is dependent upon (and limited by) the availability of incident sunlight to provide signals. Active two color photometry in accordance with the present invention can solve these problems. The principal source of optical noise at depth is focussing and defocusing of the sun's light at depth due to wave action at the air-water interface. This phenomenon is responsible for the optical noise present beneath the ocean surface both from the sun, and the illuminating laser transmitter. The solar radiation is present only during the day and is uncorrelated with the light from the illuminating laser. In fact, the focused and defocused areas may be different from the ones associated with the illuminating laser, since the two sources are not co-located. During the day, the optical noise is the sum of the contribution from these two sources. At night, of course, this kind of noise is due to the illuminating laser only.

Detailed illustrative embodiments of the invention disclosed herein are presently considered to be the best embodiments for the purposes of the invention. However, it should be recognized that a number of lasers might be utilized to illuminate the imaged ocean area at depth, as well as one, two or multi-camera configurations, amplitude control and timing schemes. Accordingly, the embodiments disclosed herein are only representative in providing a basis for the claims which provide the scope of the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of detecting and imaging anomalies below the surface of a body of water including the steps of:

selectively generating short pulses of light having at least two different wavelengths;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume, said pulses being detected using at least one gated camera means;

converting said detected pulses of light to two video images of said volume; and subtracting said two video images from one another to provide a video image of anomalies below the surface of the water.

2. The method of claim 1 wherein:

said pulses of light are generated by a single laser pumped in series to define a pair of output pulses being spaced apart and being comprised of said two different and distinct wavelengths; and said reflected pair of output pulses being detected by two camera means.

3. The method of claim 1 wherein:

said pulses of light are generated by a pair of pulsed lasers, each of said lasers delivering one of said two different wavelengths of light to define a pair of output pulses having said two different wavelengths; and said reflected pair of output pulses being detected by a single camera means.

4. The method of claim 1 wherein:

said pulses of light having two different wavelengths are generated simultaneously.

5. The method of claim 1 wherein:

said pulses of light having two different wavelengths are spaced apart by a preselected time period.

6. The method of claim 5 wherein:

said preselected time period is about one microsecond.

7. The method of claim 1 wherein:

one of the different wavelengths is the wavelength corresponding to the hingepoint and the other wavelength is a wavelength below the Jerlov minimum.

8. The method of claim 1 wherein:

the two different wavelengths are located on either side of the Jerlov minimum.

9. A method of detecting and imaging internal waves below the surface of a body of water including the steps of:

selectively generating short pulses of light having at least two different wavelengths;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume, said pulses being detected using at least one gated camera means;

converting said detected pulses of light to two video images of said volume; and subtracting said two video images from one another to provide a video image of internal waves below the surface of the water.

10. An apparatus for detecting and imaging anomalies below the surface of a body of water comprising:

generating means for selectively generating short pulses of light having at least two different wavelengths;

projecting means for projecting said short pulses of two different wavelengths of light toward the water and at a selected volume within the water;

gated camera means for detecting said pulses of two different wavelengths of light reflected back from said volume after a time delay corresponding to the round-trip propagation time of said light pulses to and from said volume;

converting means for converting said detected pulses of light to two video images of said volume; and subtracting means for subtracting said two video images from one another to provide a video image of anomalies below the surface of the water.

11. The apparatus of claim 10 wherein:

said generating means comprises a single laser pumped in series to define a pair of output pulses being spaced apart and being comprised of said two different wavelengths; and said detecting means comprises two camera means.

12. The apparatus of claim 10 wherein:

said generating means comprises a pair of pulsed lasers, each of said lasers delivering one of said two different wavelengths of light to define a pair of output pulses having two different wavelengths; and said detecting means comprises a single camera means.

13. The apparatus of claim 10 wherein:

said generating means generates said pulses of light having two different wavelengths simultaneously.

14. The apparatus of claim 10 wherein:

said generating means generates said pulses of light having two different wavelengths by a preselected spaced apart time period.

15. The apparatus of claim 14 wherein:

said preselected time period is about one microsecond.

16. The apparatus of claim 10 wherein:

one of the different wavelengths is the wavelength corresponding to the hingepoint and the other wavelength is a wavelength below the Jerlov minimum.

17. The apparatus of claim 10 wherein:

the two different wavelengths are located on either side of the Jerlov minimum.

18. The apparatus of claim 10 including:

notch filter means for receiving said reflected light pulses and passing said pulses to said detecting means.

19. A method of detecting and imaging anomalies below the surface of a body of water including the steps of:

selectively generating short pulses of light having at least two different wavelengths;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume;

converting said detected pulses of light to two video images of said volume;

subtracting said two video images from one another to provide a video image of anomalies below the surface of the water; and wherein said pulses of light are generated by a single laser pumped in series to define a pair of output pulses being spaced apart and being comprised of said two different wavelengths; and wherein said reflected pair of output pulses being detected by two camera means.

20. A method of detecting and imaging anomalies below the surface of a body of water including the steps of:

selectively generating short pulses of light having at least two different wavelengths, said pulses of light having two different wavelengths being generated simultaneously;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume;

converting said detected pulses of light to two video images of said volume;

subtracting said two video images from one another to provide a video image of anomalies below the surface of the water.

21. A method of detecting and imaging anomalies below the surface of a body of water including the steps of:

selectively generating short pulses of light having at least two different wavelengths, said pulses of light having two different wavelengths being spaced apart by a preselected time period;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume;

converting said detected pulses of light to two video images of said volume;

subtracting said two video images from one another to provide a video image of anomalies below the surface of the water.

22. The method of claim 21 wherein:

said preselected time period is about one microsecond.

23. A method of detecting and imaging anomalies below the surface of a body of water including the steps of:

selectively generating short pulses of light having at least two different wavelengths wherein one of the different wavelengths is the wavelength corresponding to the hingepoint and the other wavelength is a wavelength below the Jerlov minimum;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume;

converting said detected pulses of light to two video images of said volume;

subtracting said two video images from one another to provide a video image of anomalies below the surface of the water.

24. A method of detecting and imaging anomalies below the surface of a body of water including the steps of:

selectively generating short pulses of light having at least two different wavelengths wherein the two different wavelengths are located on either side of the Jerlov minimum;

projecting said short pulses of two different wavelengths of light toward the water and at a selected volume within the water;

detecting said pulses of two different wavelengths of light reflected back from said volume after a time delay corresponding to the round-trip propagation time of said light pulses to and from said volume;

converting said detected pulses of light to two video images of said volume;

subtracting said two video images from one another to provide a video image of anomalies below the surface of the water.

25. An apparatus for detecting and imaging anomalies below the surface of a body of water comprising:

generating means for selectively generating short pulses of light having at least two different wavelengths;

projecting means for projecting said short pulses of two different wavelengths of light toward the water and at a selected volume within the water;

detecting means for detecting said pulses of two different wavelengths of light reflected back from said volume after a time delay corresponding to the round-trip propagation time of said light pulses to and from said volume;

converting means for converting said detected pulses of light to two video images of said volume;

subtracting means for subtracting said two video images from one another to provide a video image of anomalies below the surface of the water;

wherein said generating means comprises a single laser pumped in series to define a pair of output pulses being spaced apart and being comprised of said two different wavelengths; and said detecting means comprises two camera means.

26. An apparatus for detecting and imaging anomalies below the surface of a body of water comprising:

generating means for selectively generating short pulses of light having at least two different wavelengths, said generating means generating said pulses of light having two different wavelengths simultaneously;

projecting means for projecting said short pulses of two different wavelengths of light toward the water and at a selected volume within the water;

detecting means for detecting said pulses of two different wavelengths of light reflected back from said volume after a time delay corresponding to the round-trip propagation time of said light pulses to and from said volume;

converting means for converting said detected pulses of light to two video images of said volume;

subtracting means for subtracting said two video images from one another to provide a video image of anomalies below the surface of the water.

27. An apparatus for detecting and imaging anomalies below the surface of a body of water comprising:

generating means for selectively generating short pulses of light having at least two different wavelengths, said generating means generating said pulses of light having two different wavelengths by a preselected spaced apart time period;

projecting means for projecting said short pulses of two different wavelengths of light toward the water and at a selected volume within the water;

detecting means for detecting said pulses of two different wavelengths of light reflected back from said volume after a time delay corresponding to the round-trip propagation time of said light pulses to and from said volume;

converting means for converting said detected pulses of light to two video images of said volume;

subtracting means for subtracting said two video images from one another to provide a video image of anomalies below the surface of the water.

28. The apparatus of claim 27 wherein:
said preselected time period is about one microsecond.

29. An apparatus for detecting and imaging anomalies below the surface of a body of water comprising:
generating means for selectively generating short pulses of light having at least two different wavelengths wherein one of the different wavelengths is the wavelength corresponding to the hingepoint and the other wavelength is a wavelength below the Jerlov minimum;
projecting means for projecting said short pulses of two different wavelengths of light toward the water and at a selected volume within the water;
detecting means for detecting said pulses of two different wavelengths of light reflected back from said volume after a time delay corresponding to the round-trip propagation time of said light pulses to and from said volume;
converting means for converting said detected pulses of light to two video images of said volume;
subtracting means for subtracting said two video images from one another to provide a video image of anomalies below the surface of the water.

30. An apparatus for detecting and imaging anomalies below the surface of a body of water comprising:
generating means for selectively generating short pulses of light having at least two different wavelengths wherein the two different wavelengths are located on either side of the Jerlov minimum;
projecting means for projecting said short pulses of two different wavelengths of light toward the water and at a selected volume within the water;
detecting means for detecting said pulses of two different wavelengths of light reflected back from said volume after a time delay corresponding to the round-trip propagation time of said light pulses to and from said volume;
converting means for converting said detected pulses of light to two video images of said volume;
subtracting means for subtracting said two video images from one another to provide a video image of anomalies below the surface of the water.

31. An apparatus for detecting and imaging anomalies below the surface of a body of water comprising:
generating means for selectively generating short pulses of light having at least two different wavelengths;
projecting means for projecting said short pulses of two different wavelengths of light toward the water and at a selected volume within the water;
detecting means for detecting said pulses of two different wavelengths of light reflected back from said volume after a time delay corresponding to the round-trip propagation time of said light pulses to and from said volume;
notch filter means for receiving said reflected light pulses and passing said pulses to said detecting means;
converting means for converting said detected pulses of light to two video images of said volume;
subtracting means for subtracting said two video images from one another to provide a video image of anomalies below the surface of the water.

* * * * *

UNITED STATES PATENT AND TRADEMARK OFFICE
CERTIFICATE OF CORRECTION

PATENT NO. : 5,034,810
DATED : July 23, 1991
INVENTOR(S) : R. Norris Keeler

It is certified that error appears in the above-indentified patent and that said Letters Patent is hereby corrected as shown below:

Col. 1, line 31, delete "hereof" and insert therefore --thereof--.

Col. 3, line 16, delete "$(\frac{3}{2}n)$" and insert therefore --$(\frac{1}{2}n)$--.

Signed and Sealed this

Seventeenth Day of August, 1993

Attest:

BRUCE LEHMAN

Attesting Officer     Commissioner of Patents and Trademarks